(12) United States Patent
Kubota et al.

(10) Patent No.: US 7,699,708 B2
(45) Date of Patent: Apr. 20, 2010

(54) SHAFT COUPLING MECHANISM FOR ELECTRIC POWER STEERING APPARATUS

(75) Inventors: Shuichi Kubota, Kanagawa (JP); Takashi Horiguchi, Kanagawa (JP); Katsunori Saito, Kanagawa (JP); Masao Shimura, Osaka (JP); Souichi Iwasa, Osaka (JP)

(73) Assignees: Oiles Corporation, Tokyo (JP); JTEKT Corporation, Osaka (JP)

( * ) Notice: Subject to any disclaimer, the term of this patent is extended or adjusted under 35 U.S.C. 154(b) by 519 days.

(21) Appl. No.: 11/597,170

(22) PCT Filed: May 25, 2005

(86) PCT No.: PCT/JP2005/009572

§ 371 (c)(1), (2), (4) Date: Jan. 8, 2007

(87) PCT Pub. No.: WO2005/116473

PCT Pub. Date: Dec. 8, 2005

(65) Prior Publication Data

US 2009/0143147 A1 Jun. 4, 2009

(30) Foreign Application Priority Data

May 28, 2004 (JP) ............................ 2004-158938

(51) Int. Cl.
*F16D 3/68* (2006.01)

(52) U.S. Cl. ......................................... 464/73; 180/444
(58) Field of Classification Search .................. 464/73, 464/81, 85; 180/444
See application file for complete search history.

(56) References Cited

U.S. PATENT DOCUMENTS

| 2,074,941 | A | | 3/1937 | Ricefield |
| 4,789,374 | A | * | 12/1988 | Suzuki ..................... 464/85 X |
| 6,283,867 | B1 | | 9/2001 | Aota et al. |
| 7,228,933 | B2 | * | 6/2007 | Joushita ..................... 180/444 |

FOREIGN PATENT DOCUMENTS

DE 196 00 511 C2 7/1997

(Continued)

OTHER PUBLICATIONS

Supplementary European Search Report for co-pending EP Application No. EP 05 74 3810, mailed Jul. 29, 2009, 3 pages.

(Continued)

*Primary Examiner*—Greg Binda
(74) *Attorney, Agent, or Firm*—Nixon & Vanderhye P.C.

(57) ABSTRACT

A shaft coupling mechanism 1 for an electric power steering apparatus includes a coupling base body 3 coupled to a rotating shaft 2; a coupling base body 5 coupled to a steering shaft 4 serving as a rotating shaft; and a pair of rotation transmitting members 6 and 7 which are disposed between the rotating shaft 2 and the steering shaft 4 by means of both coupling base bodies 3 and 5 and transmit the rotation of the rotating shaft 2 to the steering shaft 4.

11 Claims, 9 Drawing Sheets

FOREIGN PATENT DOCUMENTS

| | | |
|---|---|---|
| DE | 10133134 | 1/2003 |
| EP | 1 416 180 | 5/2004 |
| JP | 58-61332 | 4/1983 |
| JP | 9-4647 | 1/1997 |
| JP | 2002-145083 | 5/2002 |
| JP | 2004-148990 | 5/2004 |

OTHER PUBLICATIONS

International Search Report for PCT/JP2005/009572 dated Aug. 30, 2005.

Microfilm of the specification and drawings annexed to the request of Japanese Utility Model Application No. 134214/1982 (JP 59-39324, Mar. 1984).

* cited by examiner

[Fig. 1]
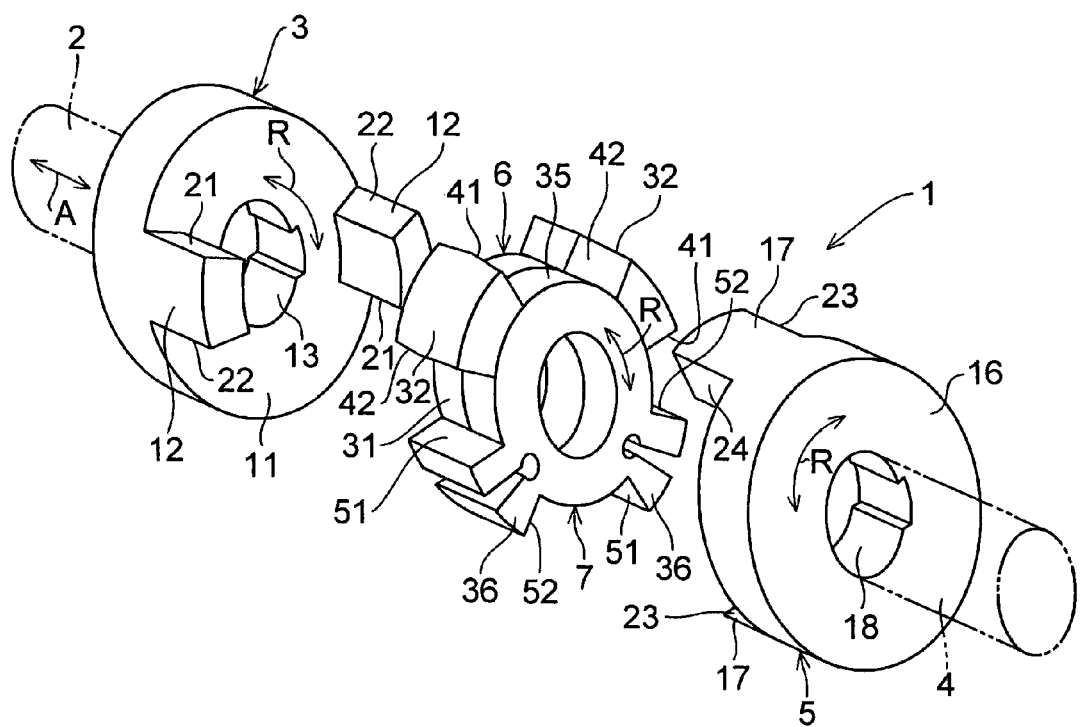
[Fig. 2]
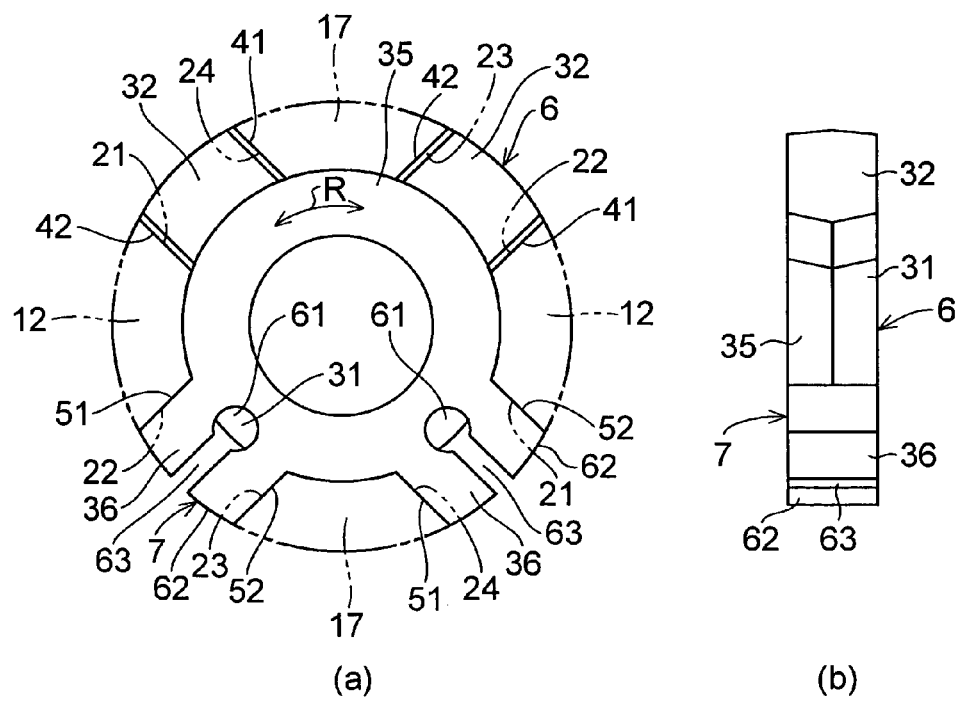
(a)          (b)

[Fig. 3]
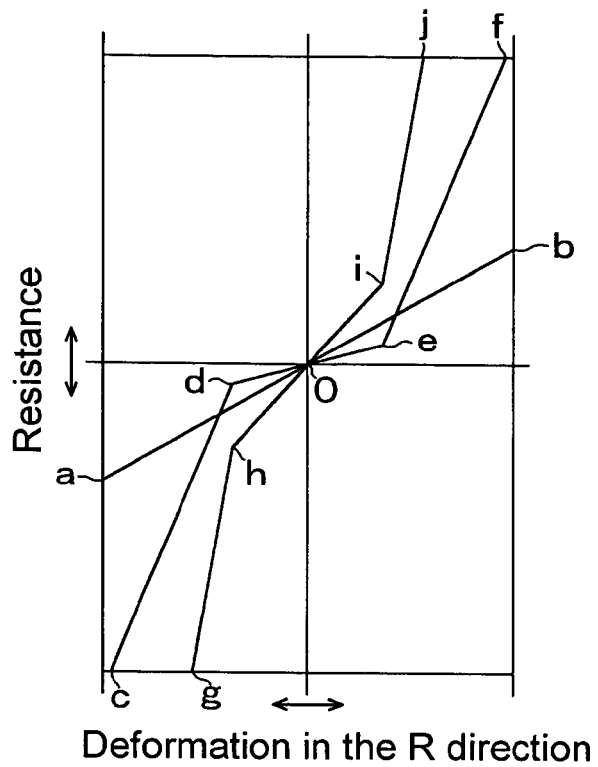
[Fig. 4]
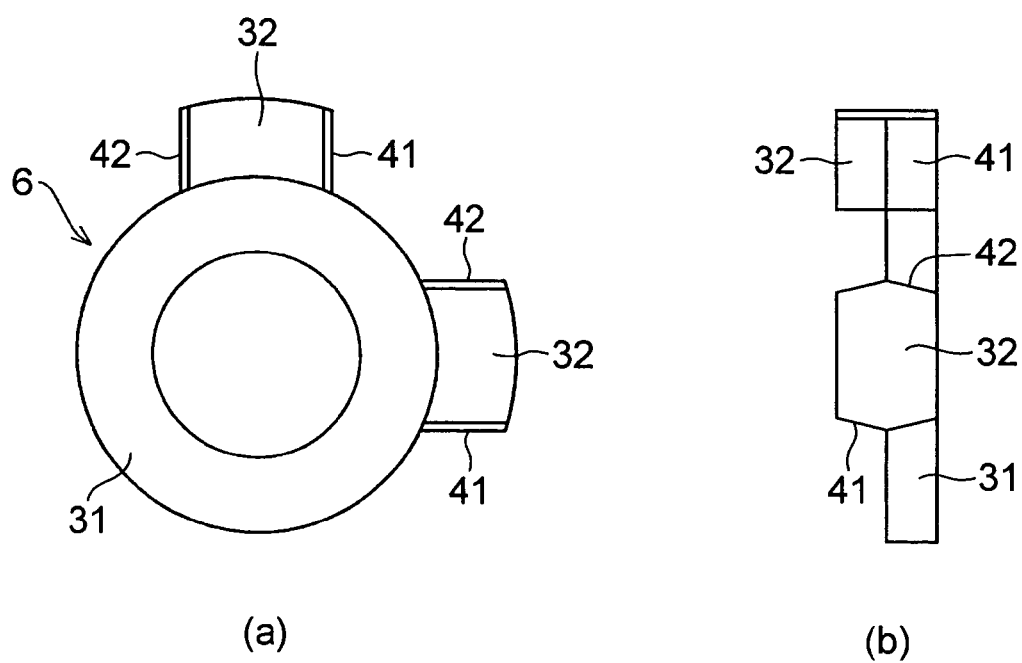
(a)　　　　　　　　　　　　　(b)

[Fig. 5]
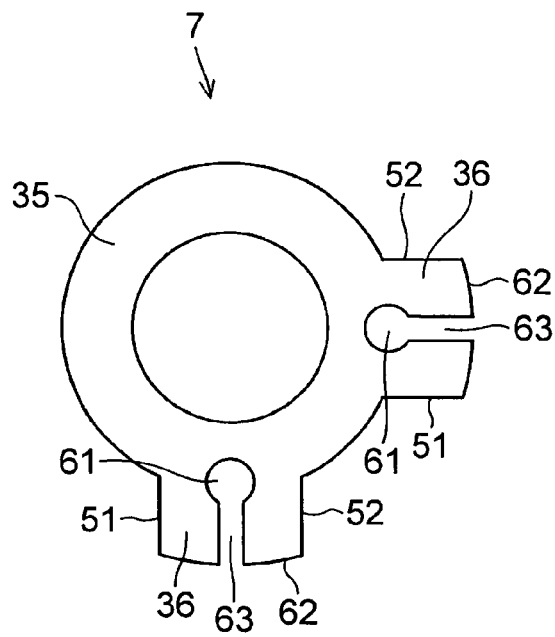
(a)
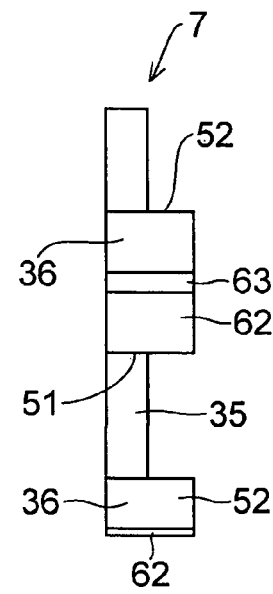
(b)
[Fig. 6]
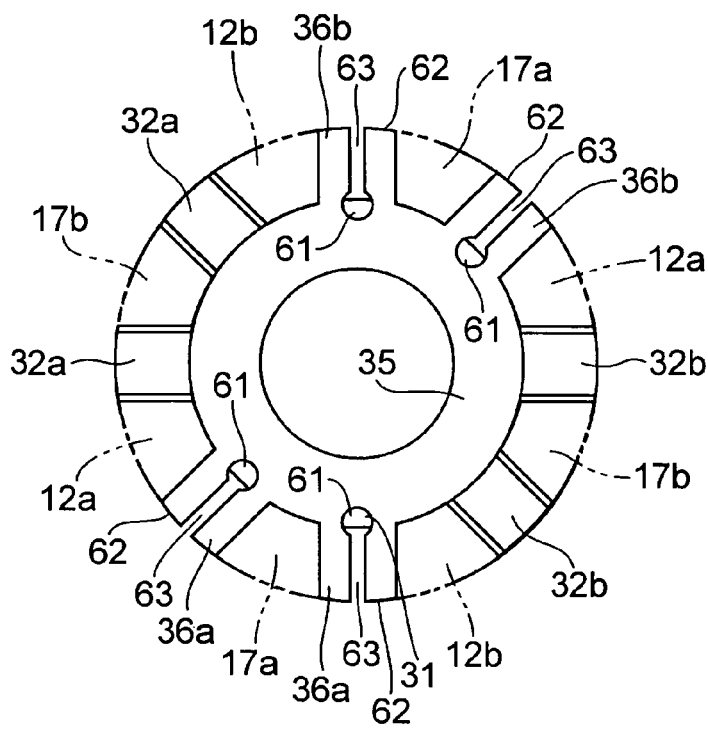
(a)
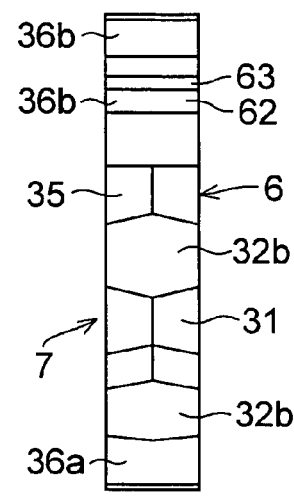
(b)

[Fig. 7]
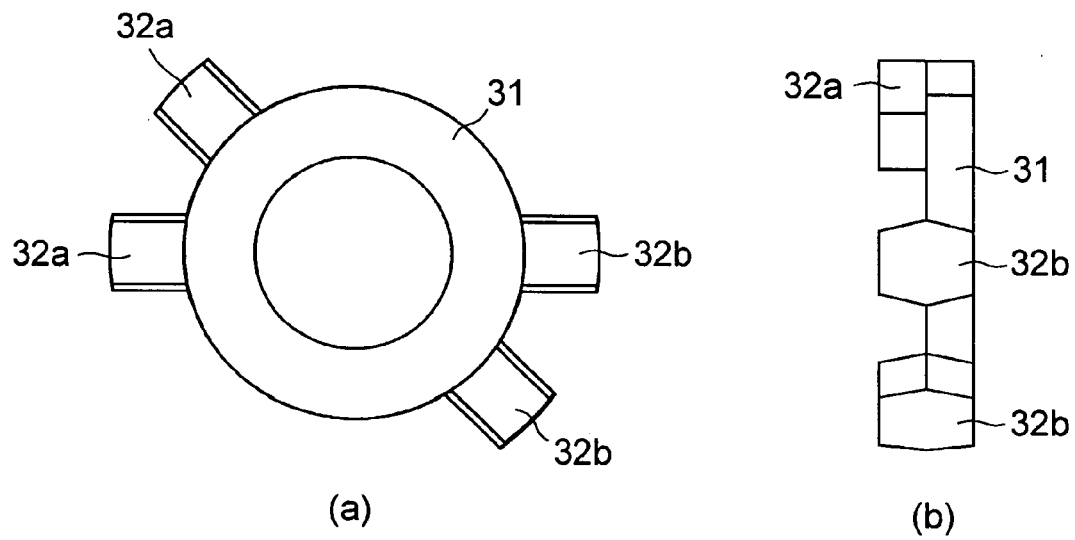
(a)　　　(b)
[Fig. 8]
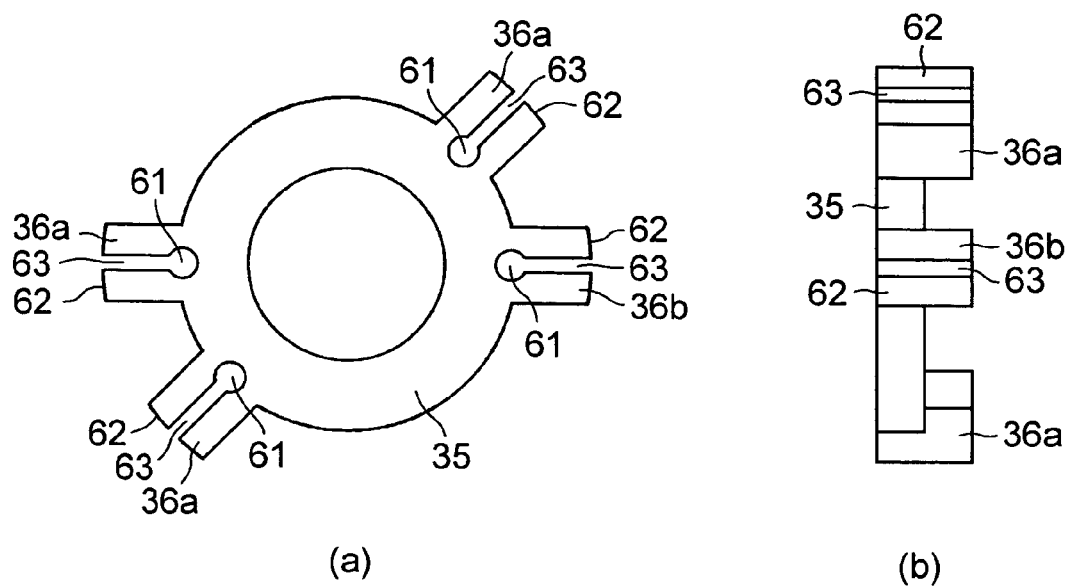
(a)　　　(b)

[Fig. 9]
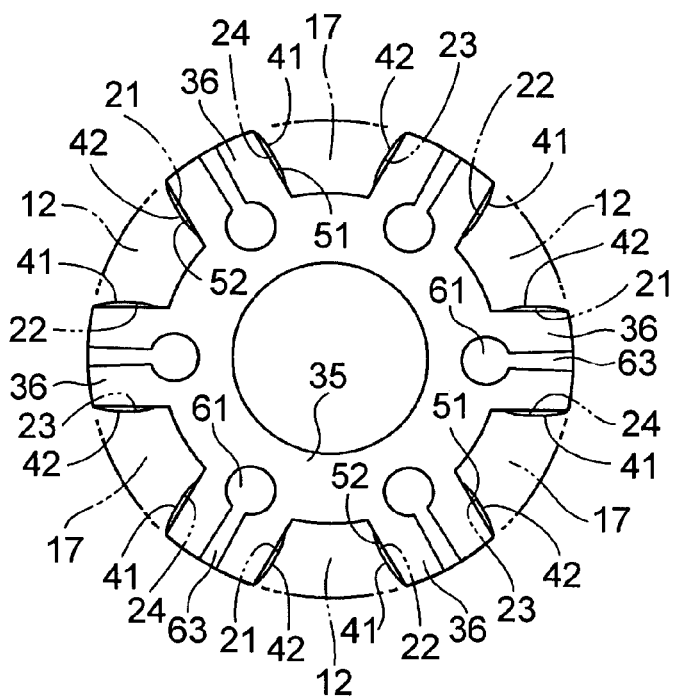
(a)
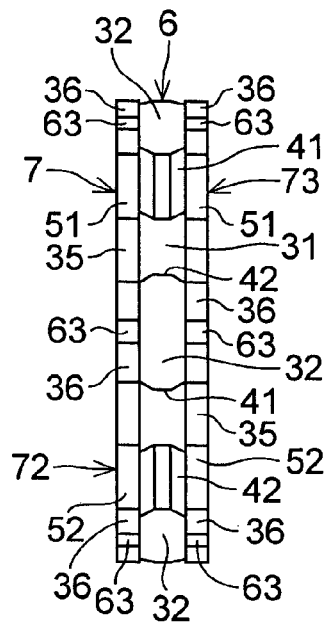
(b)
[Fig. 10]
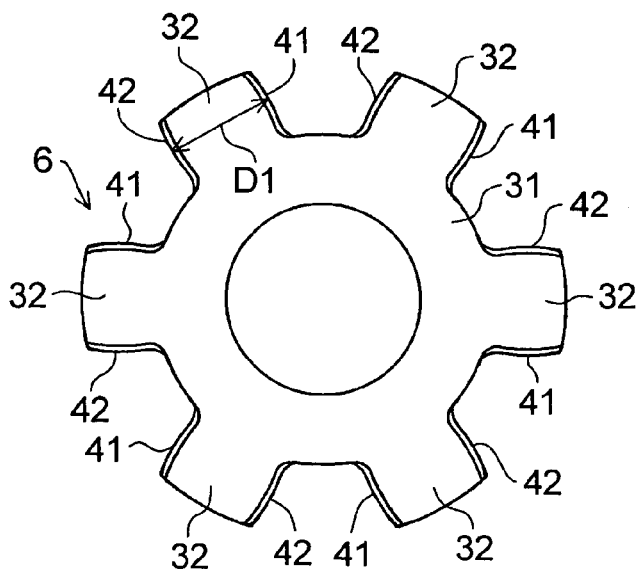
(a)
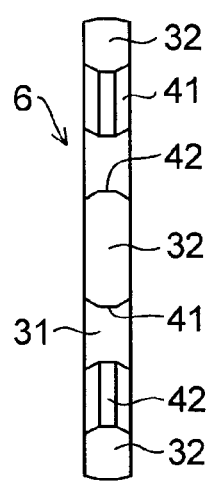
(b)

[Fig. 11]
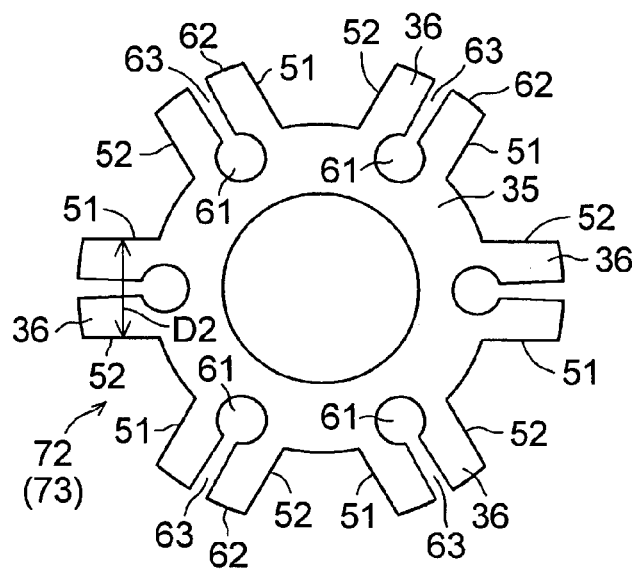 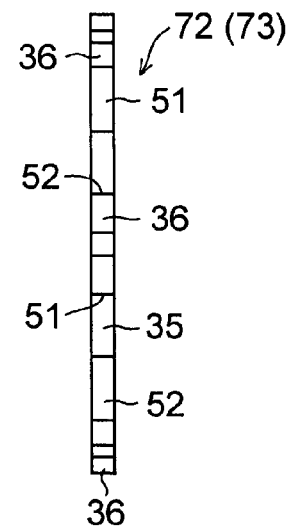
(a)             (b)
[Fig. 12]
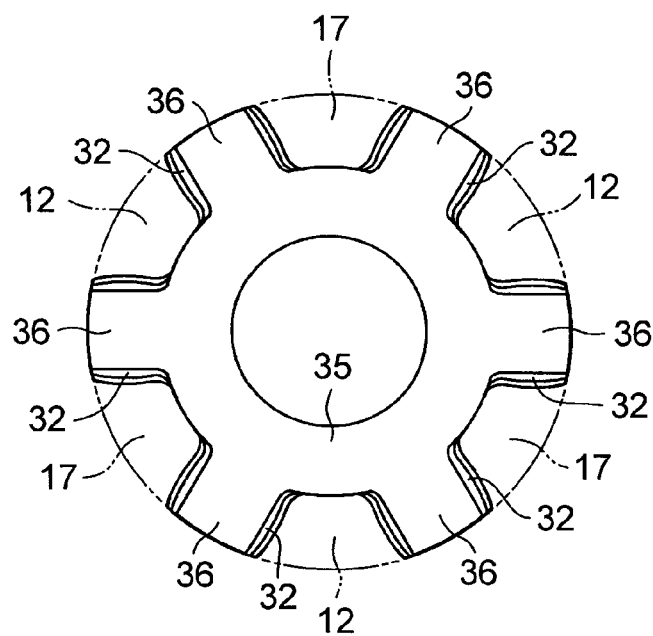 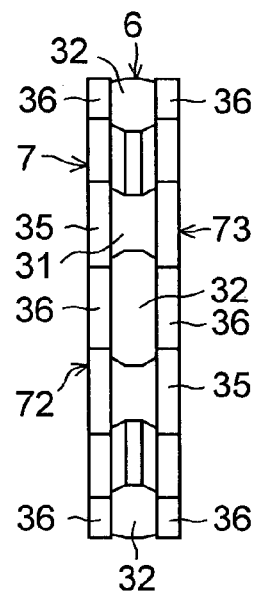
(a)             (b)

[Fig. 13]
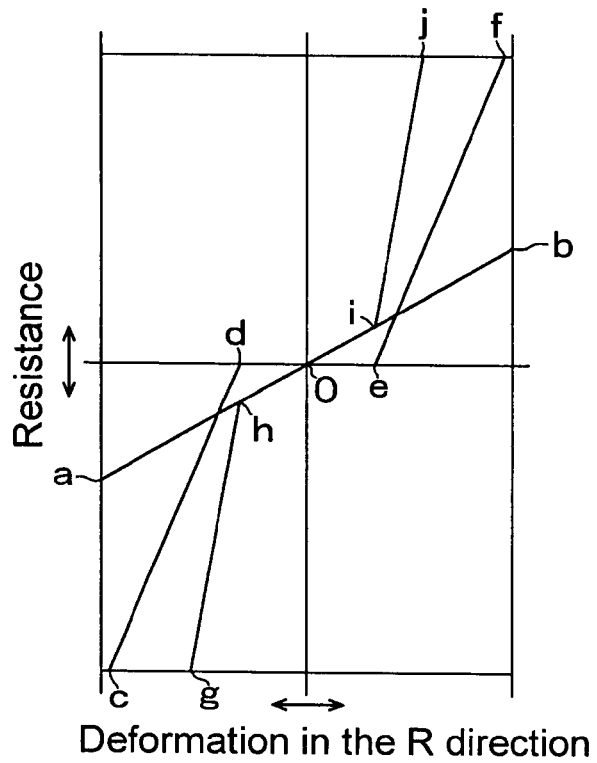
[Fig. 14]
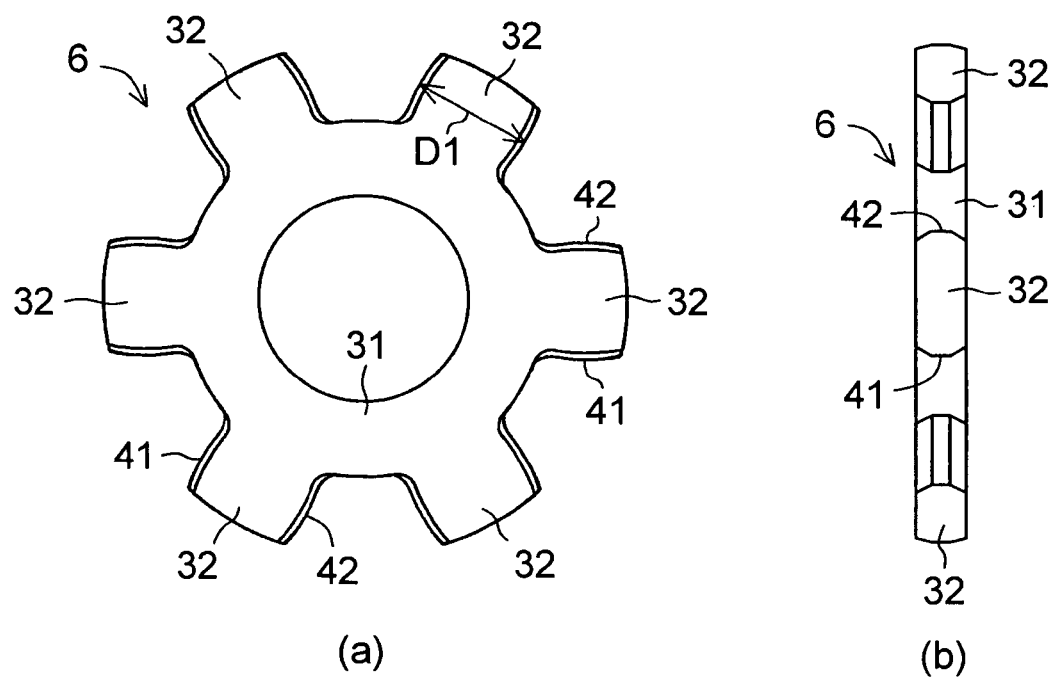
(a)　　　　　　　　(b)

[ Fig. 15 ]
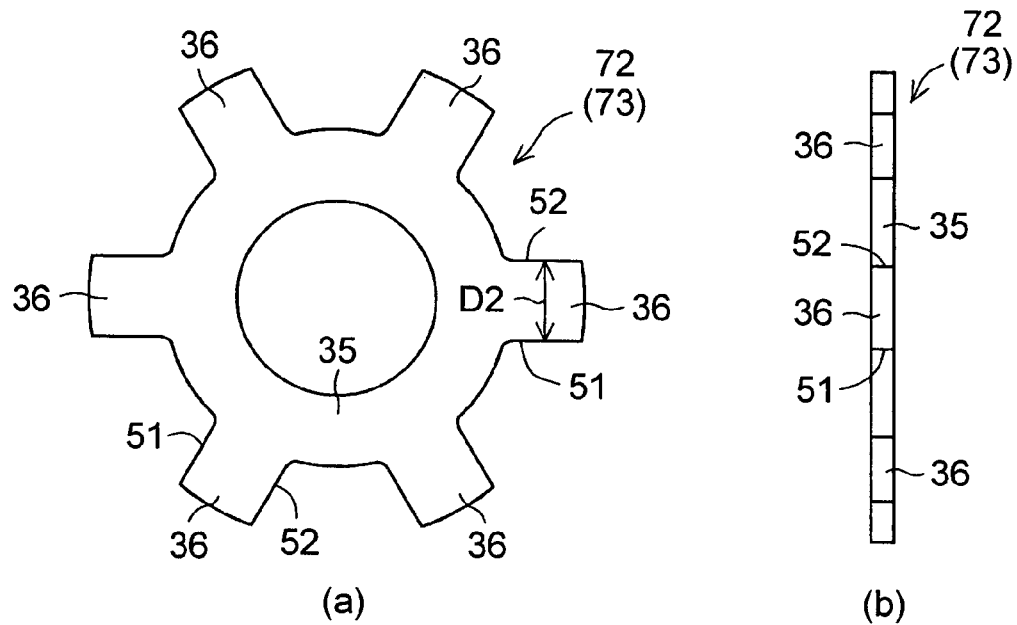
(a)  (b)
[ Fig. 16 ]
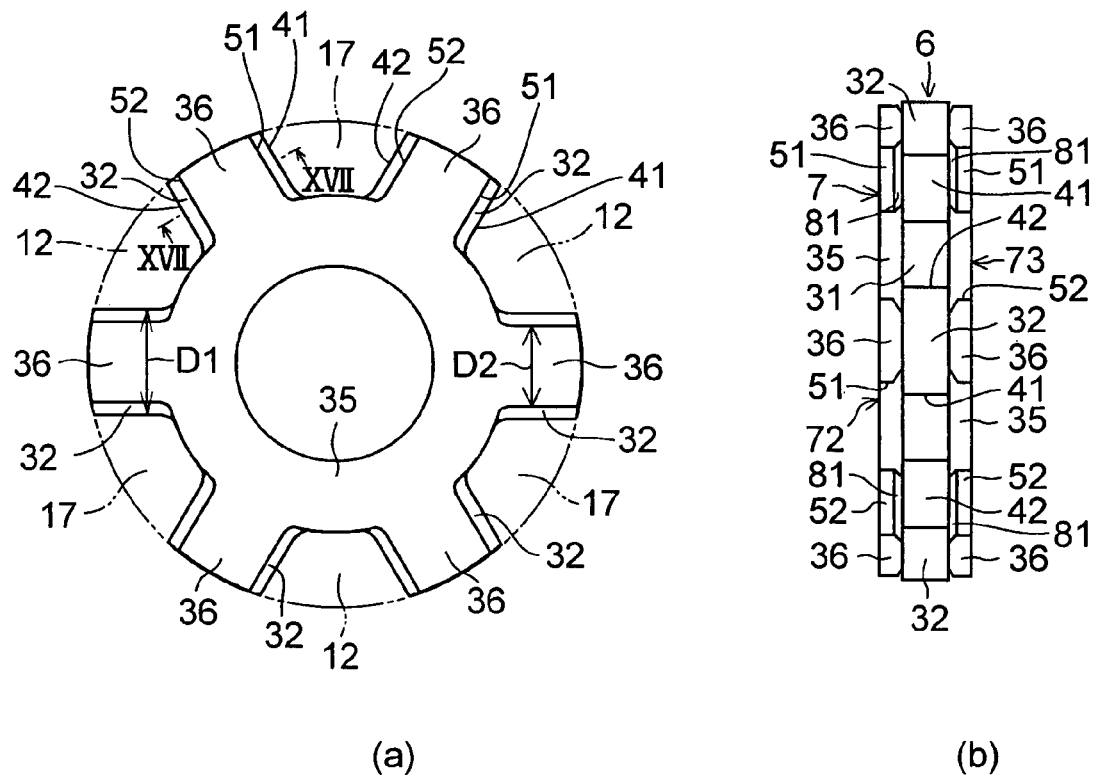
(a)  (b)

[ Fig.17 ]
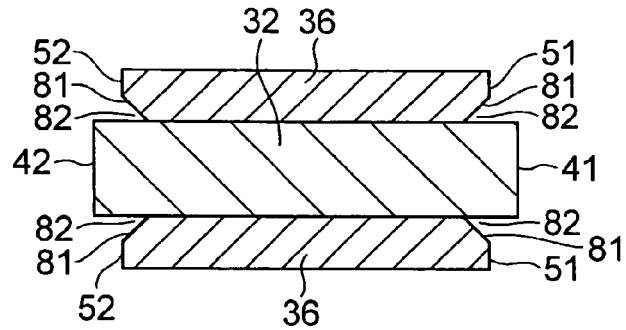
[ Fig.18 ]
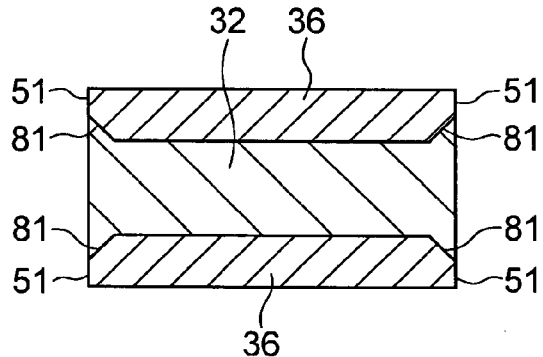
[ Fig.19 ]
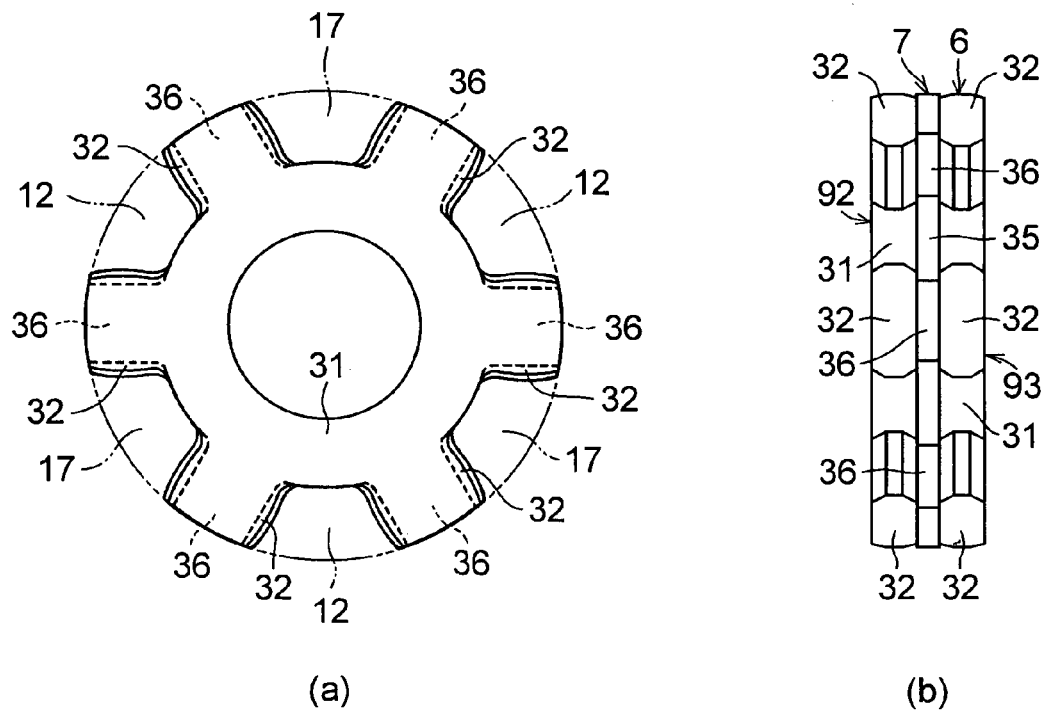
(a)　　　　　　(b)

SHAFT COUPLING MECHANISM FOR ELECTRIC POWER STEERING APPARATUS

This application is the U.S. national phase of international application PCT/JP2005/009572 filed 25 May 2005 which designated the U.S. and claims priority to JP 2004-158938 filed 28 May 2004, the entire contents of each of which are hereby incorporated by reference.

TECHNICAL FIELD

The present invention relates to a shaft coupling mechanism suitable for coupling a rotating shaft on a rotating source side such as an electric motor in an electric power steering apparatus and a rotating shaft on an operating side such as a steering shaft of an automobile.

BACKGROUND ART

Patent document 3: JP-UM-B-3-47971

An electric power steering apparatus is for facilitating the manual steering of a steering wheel by adding a torque based on the rotation of an output rotating shaft of an electric motor to a torque based on the rotation of the steering wheel which is manually operated. In such an electric power steering apparatus, the steering shaft on the steering wheel side and the rotating shaft on the output rotating shaft side of the electric motor are coupled by means of a shaft coupling mechanism (a coupling).

In the case where the steering shaft and the rotating shaft are coupled by means of the shaft coupling mechanism, there is a possibility that an impact at the time of the reversing of the output rotating shaft of the electric motor and the vibration of the brushes of the electric motor are transmitted to the steering wheel through the shaft coupling mechanism and the steering shaft, thereby causing an unpleasant steering feel to the driver. To avoid this, it has been proposed to provide a spacer made of such as rubber or soft resin for the shaft coupling mechanism.

DISCLOSURE OF THE INVENTION

Problems to be Solved by the Invention

If the spacer is made softer by placing emphasis on the reduction of the impact and vibration, since the soft spacer is likely to undergo creep deformation, backlash can occur in the shaft coupling mechanism owing to the permanent deformation of the spacer due to the repeated load on the spacer. There is a possibility that this can also make the driver's steering feel unpleasant.

On the other hand, if the spacer is made harder by placing emphasis on the durability, the steering feel improves contrary to the above since there is no backlash. However, the steering feel becomes uncomfortable due to the impact and vibration transmitted to the steering wheel, as described above.

The present invention has been devised in view of the above-described circumstances, and its object is to provide a shaft coupling mechanism for an electric power steering apparatus in which backlash in the rotating direction is difficult to occur between one rotating shaft, e.g., a rotating shaft coupled to the output rotating shaft of the electric motor, and another rotating shaft, e.g., the steering shaft coupled to the steering wheel over long periods of time, which makes it possible to reduce the transmission to the steering wheel of the impact at the time of the reversing of the electric motor and the brush vibration, and which hence excels in durability and prevents the steering feel from becoming uncomfortable.

Means for Solving the Problems

In accordance with a first aspect of the invention, there is provided a shaft coupling mechanism disposed between two rotating shafts to couple the two rotating shafts by means of a pair of rotation transmitting members for transmitting the rotation of one of the rotating shafts to another one of the rotating shafts, wherein, with respect to the relative rotation of less than a fixed degree in a direction about an axis of the two rotating shafts between the two rotating shafts, the pair of rotation transmitting members are adapted to respond with the resistance of at least one of the rotation transmitting members in the direction about the axis, and with respect to the relative rotation of the fixed degree or greater in the direction about the axis between the two rotating shafts, the pair of rotation transmitting members are adapted to respond with the resistance of the one and another one of the rotation transmitting members in the direction about the axis. The other rotation transmitting member has a rigidity smaller than the rigidity of the one rotation transmitting member with respect to the relative rotation of less than the fixed degree in the direction about the axis between the two rotating shafts, and has a rigidity greater than the rigidity of the one rotation transmitting member with respect to the relative rotation of the fixed degree or greater in the direction about the axis between the two rotating shafts. With respect to the relative rotation of less than the fixed degree in the direction about the axis between the two rotating shafts, the one rotation transmitting member has a rigidity smaller than the rigidity of the other rotation transmitting member with respect to the relative rotation of the fixed degree or greater in the direction about the axis between the two rotating shafts.

In accordance with the shaft coupling mechanism according to the first aspect, the other rotation transmitting member has a rigidity smaller than the rigidity of the one rotation transmitting member with respect to the relative rotation of less than the fixed degree in the direction about the axis between the two rotating shafts, and has a rigidity greater than the rigidity of the one rotation transmitting member with respect to the relative rotation of the fixed degree or greater in the direction about the axis between the two rotating shafts. Moreover, with respect to the relative rotation of less than the fixed degree in the direction about the axis between the two rotating shafts, the one rotation transmitting member has a rigidity smaller than the rigidity of the other rotation transmitting member with respect to the relative rotation of the fixed degree or greater in the direction about the axis between the two rotating shafts. As a result, the transmission of a very small rotation of the one rotating shaft to the other rotating shaft can be reduced, while the transmission to the other rotating shaft of a large relative rotation of the one rotating shaft for the other rotating shaft can be effected as it is. Moreover, in the deformation of a fixed degree or greater in the direction about the axis, the large deformation of the one rotation transmitting member can be prevented by the other rotation transmitting member having a large rigidity, so that the permanent deformation of the one rotation transmitting member due to creep can be reduced even by using a soft resin material having a small rigidity for the one rotation transmitting member. Thus, it is possible to reduce the transmission to the steering wheel of the impact at the time of the reversing of the electric motor and the brush vibration, and it is possible to eliminate backlash in the rotating direction between the two rotating shafts. Hence, the steering feel can be prevented from becoming uncomfortable, and the shaft coupling mechanism can be made to excel in durability.

The shaft coupling mechanism in accordance with the invention suffices if it comprises a pair of rotation transmitting members disposed between two rotating shafts as spacers in the rotating direction. However, the shaft coupling mechanism in accordance with a preferred second aspect of the invention according to the first aspect further comprises: one coupling base body coupled to the one or the other rotating shaft; and another coupling base body coupled to the other or the one rotating shaft, in which case it suffices if the pair of rotation transmitting members are disposed between the coupling base bodies.

In the shaft coupling mechanism according to the second aspect, in a case where the one coupling base body is coupled to the one rotating shaft, the other coupling base body is coupled to the other rotating shaft, and in a case where the one coupling base body is coupled to the other rotating shaft, the other coupling base body is coupled to the one rotating shaft. The one coupling base body may be directly coupled and fixed to the one or the other rotating shaft, but the one coupling base body may be indirectly coupled to the one rotating shaft through another rotation transmitting mechanism such as a gear mechanism, and the same applies to the other coupling base body.

In the shaft coupling mechanism in accordance with a preferred third aspect of the invention according to the shaft coupling mechanism in the second aspect, the one rotation transmitting member includes a base portion and at least one pair of projections provided integrally with the base portion in such a manner as to project in a radial direction, and the other rotation transmitting member includes a base portion and at least one pair of projections which are provided integrally with the base portion in such a manner as to project in the radial direction, have a rigidity smaller than the rigidity of the pair of projections of the one rotation transmitting member with respect to the relative rotation of less than the fixed degree in the direction about the axis between the two rotating shafts, and have a rigidity greater than the rigidity of the pair of projections of the one rotation transmitting member with respect to the relative rotation of the fixed degree or greater in the direction about the axis between the two rotating shafts. With respect to the relative rotation of less than the fixed degree in the direction about the axis between the two rotating shafts, the pair of projections of the one rotation transmitting member have a rigidity smaller than the rigidity of the pair of projections of the other rotation transmitting member with respect to the relative rotation of the fixed degree or greater in the direction about the axis between the two rotating shafts. Each of the one and the other coupling base bodies has a base portion and projections provided integrally with the base portion in such a manner as to project in an axial direction, the projections of the one coupling base body and the projections of the other coupling base body being arranged alternately in the direction about the axis between the pair of projections of the one rotation transmitting member, between the pair of projections of the other rotation transmitting member, and between adjacent ones of the projections of the one and the other rotation transmitting members, respectively. In this case, in the shaft coupling mechanism in a preferred fourth aspect of the invention, each of the base portions of the one and the other rotation transmitting members has a smaller thickness than the axial thickness of a corresponding one of the projections of the one and the other rotation transmitting members. Furthermore, in the shaft coupling mechanism in accordance with a preferred fifth aspect of the invention according to the shaft coupling mechanism in the third or fourth aspect, the base portions of the one and the other rotation transmitting members are superposed on each other in the axial direction.

In the shaft coupling mechanism in accordance with a preferred sixth aspect of the invention according to the shaft coupling mechanism in any one of the third to fifth aspects, the projection of the one rotation transmitting member has a linear resistance characteristic with respect to the deformation in the direction about the axis, and the projection of the other rotation transmitting member has a nonlinear resistance characteristic which, in the deformation of less than the fixed degree in the direction about the axis, exhibits a gradient smaller than the gradient of the linear resistance characteristic of the one rotation transmitting member, and which, in the deformation of the fixed degree or greater in the direction about the axis, exhibits a gradient greater than the gradient of the linear resistance characteristic of the one rotation transmitting member.

In the shaft coupling mechanism in accordance with a preferred seventh aspect of the invention according to the shaft coupling mechanism in any one of the third to sixth aspects, the projection of the one rotation transmitting member has a width in the direction about the axis which is greater than the width of the projection of the other rotation transmitting member in the direction about the axis. In this case, in the shaft coupling mechanism in accordance with a preferred eighth aspect of the invention, the projection of the other rotation transmitting member has an accommodating groove for accommodating a compressively deformed portion of the projection of the one rotation transmitting member, the accommodating groove being formed in cooperation with the projection of the one rotation transmitting member. In the shaft coupling mechanism in accordance with a preferred ninth aspect of the invention according to the shaft coupling mechanism in any one of the third to eighth aspects, the projection of the other rotation transmitting member has a slit. Furthermore, in the shaft coupling mechanism in accordance with a preferred 10th aspect of the invention according to the shaft coupling mechanism in any one of the third to ninth aspects, the one and the other coupling base bodies respectively have at least one pair of projections.

The shaft coupling mechanism in accordance with a preferred 11th aspect of the invention according to the shaft coupling mechanism in any one of the first to 10th aspects is one for an electric power steering apparatus, and the one rotating shaft may be adapted to be coupled to one of an output rotating shaft of an electric motor and a steering shaft of an automobile, and the other rotating shaft may be adapted to be coupled to another one of the output rotating shaft of the electric motor and the steering shaft of the automobile.

Advantageous Effect of the Invention

According to the present invention, it is possible to provide a shaft coupling mechanism for an electric power steering apparatus in which backlash in the rotating direction is difficult to occur between one rotating shaft, e.g., a rotating shaft coupled to the output rotating shaft of the electric motor, and another rotating shaft, e.g., the steering shaft coupled to the steering wheel over long periods of time, which makes it possible to reduce the transmission to the steering wheel of the impact at the time of the reversing of the electric motor and the brush vibration, and which hence excels in durability and prevents the steering feel from becoming uncomfortable.

BEST MODE FOR CARRYING OUT THE INVENTION

Hereafter, a more detailed description will be given of the mode for carrying out the invention on the basis of the preferred embodiment illustrated in the drawings. It should be noted that the invention is not limited to the embodiment.

BRIEF DESCRIPTION OF THE DRAWINGS

FIG. 1 is an exploded perspective view of a preferred embodiment of the invention;

FIG. 2 is an explanatory diagram of both rotation transmitting members of the embodiment shown in FIG. 1, in which the part (a) is a front elevational view, and the part (b) is a right side view of the part (a);

FIG. 3 is an explanatory characteristic diagram illustrating the relationship between displacement and resistance in the embodiment shown in FIG. 1;

FIG. 4 is an explanatory diagram of one rotation transmitting member of the embodiment shown in FIG. 1, in which the part (a) is a front elevational view, and the part (b) is a right side view of the part (a);

FIG. 5 is an explanatory diagram of the other rotation transmitting member of the embodiment shown in FIG. 1, in which the part (a) is a front elevational view, and the part (b) is a right side view of the part (a);

FIG. 6 is an explanatory diagram of another example of both rotation transmitting members which can be used in the embodiment shown in FIG. 1, in which the part (a) is a front elevational view, and the part (b) is a right side view of the part (a);

FIG. 7 is an explanatory diagram of one rotation transmitting member of the example shown in FIG. 6, in which the part (a) is a front elevational view, and the part (b) is a right side view of the part (a);

FIG. 8 is an explanatory diagram of the other rotation transmitting member of the example shown in FIG. 6, in which the part (a) is a front elevational view, and the part (b) is a right side view of the part (a);

FIG. 9 is an explanatory diagram of still another example of both rotation transmitting members which can be used in the embodiment shown in FIG. 1, in which the part (a) is a front elevational view, and the part (b) is a right side view of the part (a);

FIG. 10 is an explanatory diagram of one rotation transmitting member of the example shown in FIG. 9, in which the part (a) is a front elevational view, and the part (b) is a right side view of the part (a);

FIG. 11 is an explanatory diagram of the other rotation transmitting member of the example shown in FIG. 9, in which the part (a) is a front elevational view, and the part (b) is a right side view of the part (a);

FIG. 12 is an explanatory diagram of a further example of the rotation transmitting members which can be used in the embodiment shown in FIG. 1, in which the part (a) is a front elevational view, and the part (b) is a right side view of the part (a);

FIG. 13 is an explanatory characteristic diagram illustrating the relationship between displacement and resistance in the example shown in FIG. 12;

FIG. 14 is an explanatory diagram of one rotation transmitting member of the example shown in FIG. 12, in which the part (a) is a front elevational view, and the part (b) is a right side view of the part (a);

FIG. 15 is an explanatory diagram of the other rotation transmitting member of the example shown in FIG. 12, in which the part (a) is a front elevational view, and the part (b) is a right side view of the part (a);

FIG. 16 is an explanatory diagram of a still further example of the rotation transmitting members which can be used in the embodiment shown in FIG. 1, in which the part (a) is a front elevational view, and the part (b) is a right side view of the part (a);

FIG. 17 is a cross-sectional view taken in the direction of arrows along line XVII-XVII shown in FIG. 16;

FIG. 18 is a diagram explaining the operation of the example shown in FIGS. 16 and 17; and FIG. 19 is an explanatory diagram of a further example of both rotation transmitting members which can be used in the embodiment shown in FIG. 1, in which the part (a) is a front elevational view, and the part (b) is a right side view of the part (a).

In FIGS. 1 to 5, a shaft coupling mechanism 1 for an electric power steering apparatus in accordance with this embodiment is comprised of a coupling base body 3 coupled to a rotating shaft 2; a coupling base body 5 coupled to a steering shaft 4 serving as a rotating shaft; and a pair of rotation transmitting members 6 and 7 which are disposed between the rotating shaft 2 and the steering shaft 4 by means of both coupling base bodies 3 and 5 and transmit the rotation of the rotating shaft 2 to the steering shaft 4.

The rotating shaft 2 is a rotating shaft on an electric motor side of the electric power steering apparatus. The coupling base body 3 includes an annular base portion 11; a pair of projections 12 provided integrally with the base portion 11 in such a manner as to project in an axial direction, i.e., in an A direction, and arranged at an angular interval of 180° in the direction about the axis, i.e., in an R direction; and a through hole 13 in which the rotating shaft 2 is fitted and secured therein. The coupling base body 5 includes an annular base portion 16; a pair of projections 17 provided integrally with the base portion 16 in such a manner as to project in the A direction and arranged at an angular interval of 180° in the R direction; and a through hole 18 in which the steering shaft 4 is fitted and secured therein.

Each of the projections 12 has in the R direction a pair of side surfaces 21 and 22 serving as rotation transmitting rigid surfaces, and each of the projections 17 also has in the R direction a pair of side surfaces 23 and 24 serving as rotation transmitting rigid surfaces. The side surfaces 21 and 22 of each projection 12 are disposed between the side surface 24 and the side surface 23 of the projections 17 in the R direction. The side surfaces 23 and 24 of each projection 17 are disposed between the side surface 22 and the side surface 21 of the projections 12 in the R direction. Thus, the coupling base body 3 has two pairs of the side surfaces 21 and 22 serving as the rotation transmitting rigid surfaces, and the coupling base body 5 has two pairs of the side surfaces 23 and 24, each pair serving as a pair of rotation transmitting rigid surfaces which are disposed between the side surfaces 21 and 22 which are the rotation transmitting rigid surfaces of the respective pairs.

The rotation transmitting member 6, which is made of a soft material having a smaller rigidity than the rotation transmitting member 7, has an annular base portion 31 as well as a pair of projections 32 serving as rotation transmitting portions which are provided integrally with the base portion 31 in such a manner as to project in the radial direction, are arranged at an angular interval of 90° (or 270°) in the R direction, and exhibit a linear resistance (stress) characteristic represented by a straight line a-0-b in FIG. 3. The rotation transmitting member 7, which is made of a material having a greater rigidity than the rotation transmitting member 6, has an annular base portion 35 superposed on the base portion 31 of the rotation transmitting member 6 as well as a pair of projections 36 serving as rotation transmitting portions which are provided integrally with the base portion 35 in such a manner as to project in the radial direction, are arranged at an angular interval of 90° (or 270°) in the R direction, and exhibit a nonlinear resistance (stress) characteristic represented by a broken line c-d-0-e-f in FIG. 3.

In the rotation transmitting member 6, one projection 32 has a side surface 41 which comes into contact with the side surface 22 of one projection 12 as well as a side surface 42 which comes into contact with the side surface 23 of one projection 17, and is disposed between the side surface 22 of the one projection 12 and the side surface 23 of the one projection 17. The other projection 32 has a side surface 41 which comes into contact with the side surface 24 of the one projection 17 as well as a side surface 42 which comes into contact with the side surface 21 of the other projection 12, and is disposed between the side surface 24 of the one projection 17 and the side surface 21 of the other projection 12.

In the rotation transmitting member 7, one projection 36 has a side surface 51 which comes into contact with the side surface 22 of the other projection 12 as well as a side surface 52 which comes into contact with the side surface 23 of the other projection 17, and is disposed between the side surface 22 of the other projection 12 and the side surface 23 of the other projection 17. The other projection 36 has a side surface 51 which comes into contact with the side surface 24 of the other projection 17 as well as a side surface 52 which comes into contact with the side surface 21 of the one projection 12, and is disposed between the side surface 24 of the other projection 17 and the side surface 21 of the one projection 12.

Thus, the pair of projections 12 of the coupling base body 3 and the pair of projections 17 of the coupling base body 5 are arranged alternately in the R direction between the pair of projections 32 of the rotation transmitting member 6, between the pair of projections 36 of the rotation transmitting member 7, and between the adjacent projections 32 and 36 of the rotation transmitting members 6 and 7, respectively.

The projection 32 has the linear resistance characteristic represented by the straight line a-0-b in FIG. 3 with respect to the compressive deformation in the R direction. Each of the projections 36 has a slit 63 which communicates with a circular hole 61 provided in the base portion 35 and is open at an apex surface 62 of the projection 36. In a case where the width of the slit 63 in the R direction is present, the projection 36 is flexurally deformable in the R direction. Meanwhile, in a case where the width of the slit 63 in the R direction has become zero due to the flexural deformation in the R direction, and the slit 63 has disappeared, the projection 36 is subjected to compressive deformation instead of the flexural deformation. Thus, the projection 36 has the nonlinear resistance characteristic which, in the deformation of less than a fixed degree in the R direction, exhibits a gradient smaller than the gradient of the linear resistance characteristic of the projection 32 represented by a straight line d-0-e in FIG. 3 based on the flexural deformation, which, in the deformation of the fixed degree or greater in the R direction, exhibits a gradient greater than the gradient of a linear resistance characteristic of the projection 32 represented by straight lines c-d and e-f in FIG. 3 based on the compressive deformation, and which, as a whole, is represented by a broken line c-d-0-e-f in FIG. 3.

Thus, with respect to the relative rotation of less than the fixed degree in the R direction between the rotating shaft 2 and the steering shaft 4, i.e., with respect to such a relative rotation that the width of the slit 63 in the R direction does not become zero and the slit 63 does not disappear, the projection 32 of the rotation transmitting member 6 has a rigidity which is represented by the gradient of the straight line a-0-b and which is smaller than the rigidity of the projection 36 of the rotation transmitting member 7 with respect to the relative rotation of the fixed degree or greater in the R direction between the rotating shaft 2 and the steering shaft 4, i.e., with respect to such a relative rotation that the slit 63 disappears, i.e., the rigidity represented by the gradient of the straight lines c-d and e-f. With respect to the relative rotation of less than the fixed degree in the R direction between the rotating shaft 2 and the steering shaft 4, i.e., with respect to such a relative rotation that the slit 63 does not disappear, the projection 36 of the rotation transmitting member 7 has a rigidity which is represented by the gradient of the straight line d-0-e, i.e., a rigidity smaller than the rigidity in the R direction of the projection 32 of the rotation transmitting member 6, i.e., the rigidity represented by the gradient of the straight line a-0-b. Meanwhile, with respect to the relative rotation of the fixed degree or greater in the R direction between the rotating shaft 2 and the steering shaft 4, i.e., with respect to such a relative rotation that the slit 63 disappears, the projection 36 of the rotation transmitting member 7 has a rigidity which is represented by the gradients of the straight lines c-d and e-f, i.e., a rigidity greater than the rigidity in the R direction of the projection 32 of the rotation transmitting member 6, i.e., the rigidity represented by the gradient of the straight line a-0-b. Thus, with respect to such a relative rotation of less than the fixed degree in the R direction between the rotating shaft 2 and the steering shaft 4 that the slit 63 does not disappear, the pair of rotation transmitting members 6 and 7 are adapted to respond with the resistance in the R direction represented by the straight line h-0-i in FIG. 3 which combines the resistance of the rotation transmitting member 6 in the R direction and the resistance of the rotation transmitting member 7 in the R direction. Meanwhile, with respect to such a relative rotation of the fixed degree or greater in the R direction between the rotating shaft 2 and the steering shaft 4 that the slit 63 disappears, the pair of rotation transmitting members 6 and 7 are adapted to respond with the resistance represented by the straight lines g-h and i-j in FIG. 3 which combines the resistance of the rotation transmitting member 6 in the R direction and the resistance of the rotation transmitting member 7 in the R direction. Moreover, with respect to such a relative rotation of less than the fixed degree in the R direction between the rotating shaft 2 and the steering shaft 4 that the width of the slit 63 in the R direction does not become zero, the rotation transmitting member 6 has a rigidity smaller than the rigidity of the rotation transmitting member 7 with respect to such a relative rotation of the fixed degree or greater in the R direction between the rotating shaft 2 and the steering shaft 4 that the width of the slit 63 in the R direction becomes zero. With respect to such a relative rotation of less than the fixed degree in the R direction between the rotating shaft 2 and the steering shaft 4 that the width of the slit 63 in the R direction does not become zero, the rotation transmitting member 7 has a rigidity smaller than the rigidity of the rotation transmitting member 6, whereas with respect to such a relative rotation of the fixed degree or greater in the R direction between the rotating shaft 2 and the steering shaft 4 that the width of the slit 63 in the R direction becomes zero, the rotation transmitting member 7 has a rigidity greater than the rigidity of the rotation transmitting member 6.

The base portion 31 has a thickness smaller than the thickness of each projection 32 in the A direction, and the base portion 35 also has a thickness smaller than the thickness of each projection 36 in the A direction. The rotation transmitting members 6 and 7 are disposed such that their base portions 31 and 35 are superposed on each other in the A direction. Thus, the shaft coupling mechanism 1 is disposed between two rotating shafts consisting of the rotating shaft 2 coupled to the output rotating shaft of the electric motor and the steering shaft 4 of the automobile, and is adapted to couple the rotating shaft 2 and the steering shaft 4 by means of the coupling base bodies 3 and 5 and the pair of rotation transmitting members 6 and 7 for transmitting the rotation in the R direction of the rotating shaft 2 to the steering shaft 4.

With the electric power steering apparatus equipped with the above-described shaft coupling mechanism 1, when the steering wheel is manually operated by the driver, the steering shaft 4 is rotated in the R direction, and the rotation of the steering shaft 4 in the R direction is transmitted to a drag link and the like as reciprocating motion through an unillustrated transmission mechanism such as gears, thereby imparting a steering force for steering wheels (wheels). In the manual operation of the steering wheel by the driver, when the electric motor which is controlled by a detection signal from a torque detector for detecting the torque applied to the steering wheel is operated, the rotating shaft 2 is rotated in the R direction. The rotation of the coupling base body 3 in the R direction is then transmitted to the projections 17 of the coupling base body 5, accompanied by the deformation of the projections 32 in the R direction and the deformation of the projections 36 in the R direction which narrows the opening width of the slit 63 due to the projections 12. As a result, the torque of the rotating shaft 2 in the R direction is added to the torque of the steering shaft 4 in the R direction, thereby assisting the manual operation of the steering wheel by the driver.

Incidentally, with the shaft coupling mechanism 1, in both the state in which the steering wheel is not manually operated by the driver and the steering shaft 4 is not rotated in the R direction and the state in which the steering wheel is manually operated by the driver and the steering shaft 4 is rotated in the R direction, in a case where the rotating shaft 2 is relatively rotated with respect to the steering shaft 4 in the R direction by such a very small degree that the width of the slit 63 in the R direction does not become zero and the slit 63 does not disappear, i.e., in the relative rotation of less than the fixed degree in the R direction between the rotating shaft 2 and the steering shaft 4, the projections 32 are easily deformed by responding to such a relative rotation with a small rigidity represented by the straight line a-0-b. Also, the projections 36 each having the slit 63 are easily deformed so as to make the width of the slit 63 in the R direction small by responding to the relative rotation with a small rigidity represented by the straight line d-0-e. As a result, such a very small relative rotation of the rotating shaft 2 in the R direction is hardly transmitted to the steering shaft 4. Thus, it is possible to reduce the transmission to the steering wheel of the impact at the time of the reversing of the electric motor and the brush vibration through the shaft coupling mechanism 1 and the steering shaft 4, thereby making it possible to prevent the steering feel from becoming uncomfortable. Furthermore, when the width of the slits 63 becomes zero in the compressive deformation of the projections 32 in the R direction and the flexural deformation of the projections 36 in the R direction, the easy deformability of the projections 36 in the R direction is canceled, and the deformation of each of the projections 36 in the R direction is difficult to occur, so that the large deformation of each of the projections 32 in the R direction can be suppressed by each of the projections 36. Consequently, the permanent set of each projection 32 due to creep can be prevented, and the mutual contact in the R direction between each of the projections 32 and 36 and each of the projections 12 and 17 can be maintained over long periods of time, with the result that backlash is made difficult to occur between the steering shaft 4 and the rotating shaft 2 in the R direction. Then, when the steering shaft 4 is rotated in the R direction by the manual operation of the steering wheel by the driver, and the rotating shaft 2 is rotated in the R direction by the operation of the electric motor, such that the rotating shaft 2 tends to be relatively rotated in the R direction with respect to the steering shaft 4 by such a fixed degree or greater that the width of the slit 63 in the R direction becomes zero, the rotation transmitting members 6 and 7 transmit the rotation of the rotating shaft 2 in the R direction to the steering shaft 4 by responding to such a relative rotation in the R direction by the fixed degree or greater with the large rigidity of the projections 36 in the R direction represented by the straight lines c-d and e-f as a result of the disappearance of the slits 63 and the compression in the R direction as well as the rigidity of the projections 32 in the R direction as a result of the compression in the R direction, to thereby assist the rotation of the steering shaft 4.

Although in the above-described shaft coupling mechanism 1 the projections 12, 17, 32, and 62 are provided in one pairs, respectively, the projections may alternatively be provided in two pairs, respectively, as shown in FIGS. 6 to 8. Namely, in the shaft coupling mechanism 1 shown in FIGS. 6 to 8, the coupling base body 3 has, in addition to the rigid base portion 11 and the through hole 13, two pairs of rigid projections 12a and 12b which are provided integrally with the base portion 11 in such a manner as to project in the axial direction, i.e., in the A direction, and are arranged at angular intervals of 180° in the direction about the axis, i.e., in the R direction. The coupling base body 5 has, in addition to the rigid base portion 16 and the through hole 18, two pairs of rigid projections 17a and 17b which are provided integrally with the base portion 16 in such a manner as to project in the A direction, and are arranged at angular intervals of 180° in the R direction. The rotation transmitting member 6 has, in addition to the base portion 31, two pairs of projections 32a and 32b serving as rotation transmitting portions which are provided integrally with the base portion 31 in such a manner as to project in the radial direction, are arranged at angular intervals of 45° (or 315°) in the R direction, and have a linear resistance characteristic. The rotation transmitting member 7 has, in addition to the base portion 35, two pairs of projections 36a and 36b serving as rotation transmitting portions which are provided integrally with the base portion 35 in such a manner as to project in the radial direction, and which have a nonlinear resistance characteristic. The four projections 12a and 12b of the coupling base body 3 and the four projections 17a and 17b of the coupling base body 5 are arranged alternately in the R direction about the axis in contact with and between the two pairs of projections 32a and 32b of the rotation transmitting member 6, between the two pairs of projections 36a and 36b of the rotation transmitting member 7, and between the adjacent projections 32a and 32b as well as projections 36a and 36b of the rotation transmitting members 6 and 7, respectively.

Also with the shaft coupling mechanism 1 shown in FIGS. 6 to 8, the projections 32a and 32b exhibit the linear resistance characteristic represented by the straight line a-0-b in FIG. 3 with respect to the deformation in the R direction. Each of the projections 36a and 36b has the slit 63 which communicates with the circular hole 61 provided in the base portion 35 and is open at the apex surface 62 of each of the projections 36a and 36b. In the case where the width of the slit 63 in the R direction is present, the projections 36a and 36b are deformable in the R direction. Meanwhile, in the case where the width of the slit 63 in the R direction has become zero due to the flexural deformation in the R direction, and the slit 63 has disappeared, each of the projections 36a and 36b is subjected to compressive deformation instead of the flexural deformation. Thus, the projections 36a and 36b have the nonlinear resistance characteristic which, in the deformation of less than the fixed degree in the R direction, exhibits a gradient smaller than the gradient of the linear resistance characteristic of the projections 32a and 32b represented by the straight line d-0-e in FIG. 3 based on the flexural deformation, which, in the deformation of the fixed degree or greater in the R direction, exhibits a gradient greater than the gradient of the linear resistance characteristic of the projections 32a and 32b represented by the straight lines c-d and e-f in FIG. 3 based on the compressive deformation, and which, as a whole, is represented by the broken line c-d-0-e-f in FIG. 3.

With the electric power steering apparatus equipped with the shaft coupling mechanism 1 shown in FIGS. 6 to 8, in the same way as the one equipped with the shaft coupling mechanism 1 shown in FIGS. 1 to 5, in both the state in which the steering wheel is not manually operated by the driver and the steering shaft 4 is not rotated in the R direction and the state in which the steering wheel is manually operated by the driver and the steering shaft 4 is rotated in the R direction, in a case where the rotating shaft 2 is relatively rotated with respect to the steering shaft 4 in the R direction by a very small degree, i.e., in the relative rotation of less than the fixed degree in the R direction between the rotating shaft 2 and the steering shaft 4, the projections 32a and 32b are easily deformed by responding to such a relative rotation with a small rigidity represented by the straight line a-0-b. Also, the projections 36a and 36b each having the slit 63 are easily deformed so as to make the width of the slit 63 in the R direction small by responding to the relative rotation with a small rigidity represented by the straight line d-0-e. As a result, such a very small relative rotation of the rotating shaft 2 in the R direction is hardly transmitted to the steering shaft 4. Thus, it is possible to reduce the transmission to the steering wheel of the impact at the time of the reversing of the electric motor and the brush vibration through the shaft coupling mechanism 1 and the steering shaft 4, thereby making it possible to prevent the steering feel from becoming uncomfortable. Furthermore, when the width of the slits 63 becomes zero in the compressive deformation of the projections 32a and 32b in the R direction and the flexural deformation of the projections 36a and 36b in the R direction, the easy deformability of the projections 36a and 36b in the R direction is canceled, and the deformation of each of the projections 36a and 36b in the R direction is difficult to occur, so that the large deformation of each of the projections 32a and 32b in the R direction can be suppressed by each of the projections 36a and 36b. Consequently, the permanent set of the projections 32a and 32b due to creep can be prevented, and the mutual contact in the R direction between each of the projections 32a and 32b and the projections 36a and 36b, on the one hand, and each of the projections 12a and 12b and the projections 17a and 17b, on the other hand, can be maintained over long periods of time, with the result that backlash is made difficult to occur between the steering shaft 4 and the rotating shaft 2 in the R direction. Then, when the steering shaft 4 is rotated in the R direction by the manual operation of the steering wheel by the driver, and the rotating shaft 2 is rotated in the R direction by the operation of the electric motor, such that the rotating shaft 2 tends to be relatively rotated in the R direction with respect to the steering shaft 4 by a fixed degree or greater, the rotation transmitting members 6 and 7 transmit the rotation of the rotating shaft 2 in the R direction to the steering shaft 4 by responding to such a relative rotation in the R direction by the fixed degree or greater with the large rigidity of the projections 36a and 36b in the R direction represented by the straight lines c-d and e-f as a result of the disappearance of the slits 63 as well as the rigidity of the projections 32a and 32b in the R direction as a result of the compression in the R direction, to thereby assist the rotation of the steering shaft 4.

In addition, with each of the above-described shaft coupling mechanisms 1, the projections 32 or 32a and 32b of the rotation transmitting member 6 and the projections 36 or 36a and 36b of the rotation transmitting member 7 are arranged so as not to overlap in the A direction. Alternatively, however, as shown in FIGS. 9 to 11, the projections of the rotation transmitting member 6 and the rotation transmitting member 7 may be arranged so as to overlap in the A direction. In FIGS. 9 to 11, the coupling base body 3 has, in addition to the rigid base portion 11 and the through hole 13, three rigid projections 12 which are provided integrally with the base portion 11 in such a manner as to project in the axial direction, i.e., in the A direction, and are arranged at equiangular intervals of 120° in the direction about the axis, i.e., in the R direction. The coupling base body 5 has, in addition to the rigid base portion 16 and the through hole 18, three rigid projections 17 which are provided integrally with the base portion 16 in such a manner as to project in the A direction, and are arranged at equiangular intervals of 120° in the R direction. The rotation transmitting member 6, which is made of a material having a smaller rigidity than the rotation transmitting member 7, has the annular base portion 31 as well as six projections 32 serving as rotation transmitting portions which are provided integrally with the base portion 31 in such a manner as to project in the radial direction, and are arranged at equiangular intervals in the R direction. The rotation transmitting member 7, which is made of a material having a greater rigidity than the rotation transmitting member 6, has two rotation transmitting plates 72 and 73. Each of the rotation transmitting plates 72 and 73 has the annular base portion 35 as well as six projections 36 serving as rotation transmitting portions which are provided integrally with the base portion 35 in such a manner as to project in the radial direction, and are arranged at equiangular intervals in the R direction.

In the rotation transmitting member 6 disposed between the rotation transmitting plates 72 and 73 in the A direction, each of the projections 32 has a side surface 41 which comes into contact with the one-side surfaces 22 and 24 of the projection 12 and the projection 17, as well as a side surface 42 which comes into contact with the other side surfaces 21 and 23 of the projection 12 and the projection 17, each of the projections 32 being disposed between corresponding ones of the side surfaces 21 and 22 of the projection 12 and the side surfaces 23 and 24 of the projection 17 in the R direction. The projection 32 has the linear resistance characteristic represented by the straight line a-0-b in FIG. 3 with respect to the deformation in the R direction.

In each of the rotation transmitting plates 72 and 73 disposed with the rotation transmitting member 6 placed therebetween, each of the projections 36 has a side surface 51 which comes into contact with the one-side surfaces 22 and 24 of the projection 12 and the projection 17, a side surface 52 which comes into contact with the other side surfaces 21 and 23 of the projection 12 and the projection 17, and a slit 63 which communicates with the circular hole 61 provided in the base portion 35 and is open at the apex surface 62 of the projection 36. Each of the projections 36 is disposed between corresponding ones of the side surfaces 21 and 22 of the projection 12 and the side surfaces 23 and 24 of the projection 17 in the R direction. A nonlinear resistance characteristic is imparted to the projection 36 in the R direction by the slit 63. Namely, the projection 36 has the nonlinear resistance characteristic which, in the deformation of less than the fixed degree in the R direction, exhibits a gradient smaller than the gradient of the linear resistance characteristic of each of the projections 32 represented by the straight line d-0-e in FIG. 3, and which, in the deformation of the fixed degree or greater in the R direction, exhibits a gradient greater than the gradient of each of the projections 32 represented by the straight lines c-d and e-f in FIG. 3.

In the case of the example shown in FIGS. 9 to 11, a width D1 of the projection 32 in the R direction and a width D2 of the projection 36 in the R direction with the slit 63 completely open are substantially equal.

In the above-described rotation transmitting members 6 and 7 shown in FIGS. 9 to 11, every other projection 32 of the rotation transmitting member 6 is disposed between the side surface 22 in the R direction of the projection 12 of the coupling base body 3 and the side surface 23 in the R direction of the projection 17 of the coupling base body 5. Every other additional projection 32 of the rotation transmitting member 6 is disposed between the side surface 21 in the R direction of the projection 12 of the coupling base body 3 and the side surface 24 in the R direction of the projection 17 of the coupling base body 5. Every other projection 36 of the rotation transmitting member 7 is disposed between the side surface 22 in the R direction of the projection 12 of the coupling base body 3 and the side surface 23 in the R direction of the projection 17 of the coupling base body 5. Every other additional projection 36 of the rotation transmitting member 7 is disposed between the side surface 21 in the R direction of the projection 12 of the coupling base body 3 and the side surface 24 in the R direction of the projection 17 of the coupling base body 5. The base portions 31 and 35 of the rotation transmitting members 6 and 7 are superposed on each other in the A direction, and the projections 32 and 36 of the rotation transmitting members 6 and 7 are also superposed on each other in the A direction.

Thus, with respect to such a relative rotation of less than the fixed degree in the R direction between the rotating shaft 2 and the steering shaft 4 that the width of the slit 63 in the R direction does not become zero and the slit 63 does not disappear, the projection 32 of the rotation transmitting member 6 shown in FIGS. 9 to 11 also has a rigidity which is represented by the gradient of the straight line a-0-b in FIG. 3 and which is smaller than the rigidity of the projection 36 of the rotation transmitting member 7 represented by the gradients of the straight lines c-d and e-f in FIG. 3 with respect to such a relative rotation of a fixed degree or greater in the R direction between the rotating shaft 2 and the steering shaft 4 that the slit 63 disappears. Also, with respect to such a relative rotation of less than the fixed degree in the R direction between the rotating shaft 2 and the steering shaft 4 that the slit 63 does not disappears, the projection 36 of the rotation transmitting member 7 has a rigidity which is represented by the gradient of the straight line d-0-e in FIG. 3 and which is smaller than the rigidity in the R direction of the projection 32 of the rotation transmitting member 6 represented by the gradient of the straight line a-0-b in FIG. 3. Meanwhile, with respect to such a relative rotation of the fixed degree or greater in the R direction between the rotating shaft 2 and the steering shaft 4 that the slit 63 disappears, the projection 36 of the rotation transmitting member 7 has a rigidity which is represented by the gradients of the straight lines c-d and e-f in FIG. 3, and which is greater than the rigidity in the R direction of the projection 32 of the rotation transmitting member 6 represented by the gradient of the straight line a-0-b in FIG. 3. Thus, with respect to such a relative rotation of less than the fixed degree in the R direction between the rotating shaft 2 and the steering shaft 4 that the slit 63 does not disappear, the pair of rotation transmitting members 6 and 7 shown in FIGS. 9 to 11 are adapted to respond with the resistance in the R direction represented by the straight line h-0-i in FIG. 3 which combines the resistance of the rotation transmitting member 6 in the R direction and the resistance of the rotation transmitting member 7 in the R direction. Meanwhile, with respect to such a relative rotation of the fixed degree or greater in the R direction between the rotating shaft 2 and the steering shaft 4 that the slit 63 disappears, the pair of rotation transmitting members 6 and 7 are adapted to respond with the resistance represented by the straight lines g-h and i-j in FIG. 3 which combines the resistance of the rotation transmitting member 6 in the R direction and the resistance of the rotation transmitting member 7 in the R direction. Moreover, with respect to such a relative rotation of less than the fixed degree in the R direction between the rotating shaft 2 and the steering shaft 4 that the width of the slit 63 in the R direction does not become zero, the rotation transmitting member 6 has a rigidity smaller than the rigidity of the rotation transmitting member 7 with respect to such a relative rotation of the fixed degree or greater in the R direction between the rotating shaft 2 and the steering shaft 4 that the width of the slit 63 in the R direction becomes zero. The rotation transmitting member 7 has a rigidity smaller than the rigidity of the rotation transmitting member 6 with respect to such a relative rotation of less than the fixed degree in the R direction between the rotating shaft 2 and the steering shaft 4 that the width of the slit 63 in the R direction does not become zero, and yet has a rigidity greater than the rigidity of the rotation transmitting member 6 with respect to such a relative rotation of the fixed degree greater in the R direction between the rotating shaft 2 and the steering shaft 4 that the width of the slit 63 in the R direction becomes zero.

Also with the shaft coupling mechanism 1 equipped with the rotation transmitting members 6 and 7 shown in FIGS. 9 to 11, if the coupling base body 3 is rotated in the R direction by the rotation of the rotating shaft 2 in the manual operation of the steering wheel by the driver, the rotation of the coupling base body 3 in the R direction is transmitted to the projections 17 of the coupling base body 5, accompanied by the deformation of the projections 32 in the R direction and the deformation of the projections 36 in the R direction which narrows the opening width of the slit 63 due to the projections 12. As a result, the torque of the rotating shaft 2 in the R direction is added to the torque of the steering shaft 4 in the R direction, thereby assisting the manual operation of the steering wheel by the driver. In the rotation transmitting members 6 and 7 shown in FIGS. 9 to 11, in the case where the rotating shaft 2 is relatively rotated with respect to the steering shaft 4 in the R direction by a very small degree, i.e., in such a relative rotation of less than the fixed degree in the R direction between the rotating shaft 2 and the steering shaft 4 that the width of the slit 63 in the R direction does not become zero, the projections 32 are easily deformed by responding to such a relative rotation with a small rigidity represented by the straight line a-0-b. Also, the projections 36 each having the slit 63 are easily deformed so as to make the width of the slit 63 in the R direction small by responding to the relative rotation with a small rigidity represented by the straight line d-0-e. As a result, such a very small relative rotation of the rotating shaft 2 in the R direction is hardly transmitted to the rotating shaft 2. Thus, it is possible to reduce the transmission to the steering wheel of the impact at the time of the reversing of the electric motor and the brush vibration through the shaft coupling mechanism 1 and the steering shaft 4, thereby making it possible to prevent the steering feel from becoming uncomfortable. Furthermore, when the width of the slits 63 becomes zero in the compressive deformation of the projections 32 in the R direction and the flexural deformation of the projections 36 in the R direction, the easy deformability of the projections 36 in the R direction is canceled, and the deformation of each of the projections 36 in the R direction is difficult to occur, so that the large deformation of each of the projections 32 in the R direction can be suppressed by each of the projections 36. Consequently, the permanent set of each projection 32 due to creep can be prevented, and the mutual contact in the R direction between each of the projections 32 and 36 and each of the projections 12 and 17 can be maintained over long periods of time, with the result that backlash is made difficult to occur between the steering shaft 4 and the rotating shaft 2 in the R direction. Then, when the steering shaft 4 is rotated in the R direction by the manual operation of the steering wheel by the driver, and the rotating shaft 2 is rotated in the R direction by the operation of the electric motor, such that the rotating shaft 2 tends to be relatively rotated in the R direction with respect to the steering shaft 4 by a fixed degree or greater, the rotation transmitting members 6 and 7 transmit the rotation of the rotating shaft 2 in the R direction to the steering shaft 4 by mainly responding to such a relative rotation in the R direction by the fixed degree or greater with the large rigidity of the projections 36 in the R direction represented by the straight lines c-d and e-f as a result of the disappearance of the slits 63, to thereby assist the rotation of the steering shaft 4.

In the rotation transmitting members 6 and 7 shown in FIGS. 9 to 11, the slit 63 is provided in each projection 36, and the widths D1 and D2 of the projection 32 and the projection 36 in the R direction are made substantially equal. Alternatively, as shown in FIGS. 12 to 15, the rotation transmitting plates 72 and 73 of the rotation transmitting member 7 may be constructed with the projections 36 without the slits 63, and the rotation transmitting members 6 and 7 may be formed such that the width D1 of the projection 32 in the R direction becomes greater than the width D2 of the projection 36 in the R direction. In this case, with respect to such a relative rotation of less than the fixed degree in the R direction between the rotating shaft 2 and the steering shaft 4 that the width D1 of the projection 32 in the R direction does not become equal to the width D2 of the projection 36 in the R direction owing to the deformation of the projection 32, the projection 32 of the rotation transmitting member 6 has a rigidity which is represented by the straight line a-0-b in FIG. 13, and which is smaller than the rigidity of the projection 36 of the rotation transmitting member 7 represented by the gradients of the straight lines c-d and e-f in FIG. 13 with respect to such a relative rotation of the fixed degree or greater in the R direction between the rotating shaft 2 and the steering shaft 4 that the width D1 of the projection 32 in the R direction becomes equal to the width D2 of the projection 36 in the R direction owing to the deformation of the projection 32. With respect to such a relative rotation of less than the fixed degree in the R direction between the rotating shaft 2 and the steering shaft 4 that the width D1 of the projection 32 in the R direction does not become equal to the width D2 of the projection 36 in the R direction owing to the deformation of the projection 32, the projection 36 of the rotation transmitting member 7 has a rigidity which is represented by the straight line d-0-e in FIG. 13 and which is smaller than the rigidity of the projection 32 of the rotation transmitting member 6 in the R direction represented by the gradient of the straight line a-0-b in FIG. 13, i.e., in this example, an equivalent rigidity in which the resistance (stress) based on the noncontact to the projections 12 and 17 is zero. Meanwhile, with respect to such a relative rotation of the fixed degree or greater in the R direction between the rotating shaft 2 and the steering shaft 4 that the width D1 of the projection 32 in the R direction becomes equal to the width D2 of the projection 36 in the R direction owing to the deformation of the projection 32, the projection 36 of the rotation transmitting member 7 has a rigidity which is represented by the straight lines c-d and e-f in FIG. 13 and which is greater than the rigidity of the projection 32 of the rotation transmitting member 6 in the R direction represented by the gradient of the straight line a-0-b in FIG. 13. Thus, with respect to such a relative rotation of less than the fixed degree in the R direction between the rotating shaft 2 and the steering shaft 4 that the width D1 of the projection 32 in the R direction and the width D2 of the projection 36 in the R direction do not become equal, the pair of rotation transmitting members 6 and 7 shown in FIGS. 12 to 15 are adapted to respond with the resistance of the rotation transmitting member 6 in the R direction represented by the straight line h-0-i in FIG. 13. Meanwhile, with respect to such a relative rotation of the fixed degree or greater in the R direction between the rotating shaft 2 and the steering shaft 4 that the width D1 of the projection 32 in the R direction and the width D2 of the projection 36 in the R direction become equal, the pair of rotation transmitting members 6 and 7 are adapted to respond with the resistance represented by the straight lines g-h and i-j in FIG. 13 which combines the resistance of the rotation transmitting member 6 in the R direction and the resistance of the rotation transmitting member 7 in the R direction. Moreover, with respect to such a relative rotation of less than the fixed degree in the R direction between the rotating shaft 2 and the steering shaft 4 that the width D1 of the projection 32 in the R direction and the width D2 of the projection 36 in the R direction do not become equal, the rotation transmitting member 6 has a rigidity smaller than the rigidity of the rotation transmitting member 7 with respect to such a relative rotation of the fixed degree or greater in the R direction between the rotating shaft 2 and the steering shaft 4 that the width D1 of the projection 32 in the R direction and the width D2 of the projection 36 in the R direction become equal. The rotation transmitting member 7 has a rigidity smaller than the rigidity of the rotation transmitting member 6 with respect to such a relative rotation of less than the fixed degree in the R direction between the rotating shaft 2 and the steering shaft 4 that the width D1 of the projection 32 in the R direction and the width D2 of the projection 36 in the R direction do not become equal, and yet has a rigidity greater than the rigidity of the rotation transmitting member 6 with respect to such a relative rotation of the fixed degree or greater in the R direction between the rotating shaft 2 and the steering shaft 4 that the width D1 of the projection 32 in the R direction and the width D2 of the projection 36 in the R direction become equal. It should be noted that, as described above, in this example, in the relative rotation of less than the fixed degree in the R direction between the rotating shaft 2 and the steering shaft 4, since the projection 36 is not deformed until the width D1 of the projection 32 in the R direction becomes equal to the width D2 of the projection 36 in the R direction owing to the deformation of the projection 32, the projection 36 exhibits a zero rigidity represented by a straight line d-e, as shown equivalently in FIG. 13.

Also in the example shown in FIGS. 12 to 15, after the coupling base body 3 is rotated in the R direction by the rotation of the rotating shaft 2 in the R direction, and the projections 32 are deformed in the R direction by the operation of the electric motor, when the width D1 of the projection 32 in the R direction becomes equal to the width D2 of the projection 36 in the R direction, the rotation of the coupling base body 3 in the R direction is transmitted to the projections 17 of the coupling base body 5 mainly through the projections 36. As a result, the torque of the rotating shaft 2 in the R direction is added to the torque of the steering shaft 4 in the R direction, thereby assisting the manual operation of the steering wheel by the driver. In the rotation transmitting members 6 and 7 shown in FIGS. 12 to 15, in the case where the rotating shaft 2 is relatively rotated with respect to the steering shaft 4 in the R direction by a very small degree, i.e., in such a relative rotation of less than the fixed degree in the R direction between the rotating shaft 2 and the steering shaft 4 that the width D1 of the projection 32 in the R direction does not become equal to the width D2 of the projection 36 in the R direction, the projections 32 are easily deformed by responding to such a relative rotation with a small rigidity represented by the straight line a-0-b, as shown in FIG. 13. As a result, the very small relative rotation of the rotating shaft 2 in the R direction is hardly transmitted to the steering shaft 4. Thus, the very small relative rotation of the rotating shaft 2 in the R direction with respect to the steering shaft 4 can be absorbed by mainly the easy deformability of the projections 32 in the R direction, with the result that it is possible to reduce the transmission to the steering wheel of the impact at the time of the reversing of the electric motor and the brush vibration through the shaft coupling mechanism 1 and the steering shaft 4, thereby making it possible to prevent the steering feel from becoming uncomfortable. Moreover, in the case where the rotating shaft 2 tends to be relatively rotated in the R direction by the fixed degree or greater with respect to the steering shaft 4 such that the width D1 of the projection 32 in the R direction becomes equal to the width D2 of the projection 36 in the R direction, the rotation transmitting members 6 and 7 transmit the rotation of the rotating shaft 2 in the R direction to the steering shaft 4 by mainly responding to such a relative rotation in the R direction by the fixed degree or greater with the large rigidity of the projections 36 in the R direction represented by the straight line c-d or e-f, as shown in FIG. 13, to thereby assist the rotation of the steering shaft 4. Consequently, the large deformation of each of the projections 32 in the R direction can be suppressed by each of the projections 36, and the permanent set of each projection 32 due to creep can be prevented. Further, the mutual contact in the R direction between each of the projections 32 and 36 and each of the projections 12 of the coupling base body 3 and the projections 17 of the coupling base body 5 can be maintained over long periods of time, with the result that backlash can be made difficult to occur between the steering shaft 4 and the rotating shaft 2 in the R direction.

In the case where the rotation transmitting members 6 and 7 are used in which the width D1 of the projection 32 in the R direction is greater than the width D2 of the projection 36 in the R direction as in the example shown in FIGS. 12 to 15, in the integration for superposing the rotation transmitting members 6 and 7 in the A direction, the rotation transmitting member 6 and the rotation transmitting member 7 may be fitted to each other at their recesses and projections so that the rotation transmitting member 7 does not relatively move in the R direction with respect to the rotation transmitting member 6. In this case, it suffices if the rotation transmitting member 6 and the rotation transmitting member 7 are fitted to each other at their projections and recesses such that each projection 36 is disposed in the center of each projection 32 in the R direction when the projections 32 are not compressively deformed. As for such fitting at the projections and recesses, it suffices if, for example, projections are provided on the inner peripheral side of the annular base portion 31, while recesses to which these projections are fitted are provided on the inner peripheral side of the annular base portion 35, and the fitting is effected at such projections and recesses.

In the above-described examples, the side surfaces 41 and 42 of the projection 32 are made slightly higher at the central portion thereof in the thicknesswise direction of the projection 32. Alternatively, the side surfaces 41 and 42 of the projection 32 may be made flat surfaces in the same way as the side surfaces 51 and 52 of the projection 36, as shown in FIG. 16. Furthermore, as shown in FIGS. 16 and 17, an arrangement may be provided such that tapered surfaces 81 are respectively provided on the side surfaces 51 and 52 of each projection 36 of the rotation transmitting members 72 and 73, so that an accommodating groove 82 is formed between each projection 36 and the rotation transmitting member 6 on the side surfaces 51 and 52 side in the case where the rotation transmitting member 6 and the rotation transmitting member 7 consisting of the rotation transmitting plates 72 and 73 are superposed on top of each other, thereby allowing a portion of each projection 32 of the rotation transmitting member 6 which has been crushed by compressive deformation to be accommodated in the accommodating groove 82, as shown in FIG. 18. If the accommodating grooves 82 for accommodating the compressively deformed portions of the projections 32 are thus formed on the respective projections 36 in cooperation with the projections 32, portions of the projections 32 of the rotation transmitting member 6 which have been crushed by the compressive deformation are prevented from covering the side surfaces 51 and 52 of the projections 36 by spreading to the side surfaces 51 and 52 of the projections 36. Consequently, in the resistance characteristic represented by a broken line g-h-0-i-j, its points of inflection h and i can be made to appear more distinctly, and the permanent set of the projections 32 of the rotation transmitting member 6 due to creep can be prevented effectively.

Although each of the rotation transmitting members 7 shown in FIGS. 9 to 11, FIGS. 12 to 15, and FIG. 16 consists of two rotation transmitting plates 72 and 73, the rotation transmitting member 7 may alternatively consist of one or three or more rotation transmitting plates. Similarly, the rotation transmitting member 6 may also consist of two or more rotation transmitting plates. In addition, in each of the rotation transmitting members 7, the projections 36 having the slits 63 and the projections 36 without the slits 63 may be present in a mixed manner. Moreover, the numbers of the projections of the coupling base bodies 5 and 6 and the rotation transmitting members 6 and 7 are not limited to the above-described ones. Further, the shaft coupling mechanism 1 may be embodied by disposing the rotation transmitting member 6 on the steering shaft 4 side and the rotation transmitting member 7 on the rotating shaft 2 side.

In the shaft coupling mechanisms 1 shown in FIGS. 9 to 11, FIGS. 12 to 15, and FIG. 16, the rotation transmitting plates 72 and 73 are disposed with the rotation transmitting member 6 placed therebetween by using the rotation transmitting member 7 having the two rotation transmitting plates 72 and 73. Alternatively, as shown in FIG. 19, by using the rotation transmitting member 6 having two rotation transmitting plates 92 and 93 formed of a soft material having a smaller rigidity than the rotation transmitting member 7, the rotation transmitting plates 92 and 93 are disposed with the rotation transmitting member 7 placed therebetween. Also in the case of such an example shown in FIG. 19, each of the rotation transmitting plates 92 and 93 has the annular base portion 31 as well as the projections 32 serving as the rotation transmitting portions which are provided integrally with the base portion 31 in such a manner as to project in the radial direction, and are arranged at equiangular intervals in the R direction. Also with the shaft coupling mechanism 1 shown in FIG. 19, the very small relative rotation of the rotating shaft 2 in the R direction with respect to the steering shaft 4 can be absorbed by mainly the easy deformability of the projections 32 in the R direction, with the result that it is possible to reduce the transmission to the steering wheel of the impact at the time of the reversing of the electric motor and the brush vibration through the shaft coupling mechanism 1 and the steering shaft 4, thereby making it possible to prevent the steering feel from becoming uncomfortable. Moreover, the large deformation of each of the projections 32 in the R direction can be suppressed by each of the projections 36, and the permanent set of each projection 32 due to creep can be prevented. Further, the mutual contact in the R direction between each of the projections 32 and 36 and each of the projections 12 of the coupling base body 3 and the projections 17 of the coupling base body 5 can be maintained over long periods of time, with the result that backlash can be made difficult to occur between the steering shaft 4 and the rotating shaft 2 in the R direction.

The invention claimed is:

1. A shaft coupling mechanism disposed between two rotating shafts to couple the two rotating shafts by a pair of rotation transmitting members configured to transmit the rotation of one of the rotating shafts to another one of the rotating shafts, wherein the shaft coupling mechanism comprising one coupling base body coupled to the one or the other rotating shaft; and another coupling base body coupled to the other or the one rotating shaft, wherein said pair of rotation transmitting members are disposed between said coupling base bodies, wherein, with respect to the relative rotation of less than a fixed degree in a direction about an axis of the two rotating shafts between the two rotating shafts, said pair of rotation transmitting members are adapted to respond with the resistance of at least one of said rotation transmitting members in the direction about the axis, and with respect to the relative rotation of the fixed degree or greater in the direction about the axis between the two rotating shafts, said pair of rotation transmitting members are adapted to respond with the resistance of said one and another one of said rotation transmitting members in the direction about the axis, wherein said other rotation transmitting member has a rigidity smaller than the rigidity of said one rotation transmitting member with respect to the relative rotation of less than the fixed degree in the direction about the axis between the two rotating shafts, and has a rigidity greater than the rigidity of said one rotation transmitting member with respect to the relative rotation of the fixed degree or greater in the direction about the axis between the two rotating shafts, and wherein, with respect to the relative rotation of less than the fixed degree in the direction about the axis between the two rotating shafts, said one rotation transmitting member has a rigidity smaller than the rigidity of said other rotation transmitting member with respect to the relative rotation of the fixed degree or greater in the direction about the axis between the two rotating shafts, wherein said one rotation transmitting member includes a base portion and at least one pair of projections provided integrally with the base portion in such a manner as to project in a radial direction, and said other rotation transmitting member includes a base portion and at least one pair of projections which are provided integrally with the base portion in such a manner as to project in the radial direction, said pair of projections of said other rotation transmitting member having a rigidity smaller than the rigidity of the pair of projections of said one rotation transmitting member with respect to the relative rotation of less than the fixed degree in the direction about the axis between the two rotating shafts, said pair of projections of said other rotation transmitting member having a rigidity greater than the rigidity of the pair of projections of said one rotation transmitting member with respect to the relative rotation of the fixed degree or greater in the direction about the axis between the two rotating shafts, wherein, with respect to the relative rotation of less than the fixed degree in the direction about the axis between the two rotating shafts, the pair of projections of said one rotation transmitting member have a rigidity smaller than the rigidity of the pair of projections of said other rotation transmitting member with respect to the relative rotation of the fixed degree or greater in the direction about the axis between the two rotating shafts, and wherein each of said one and said other coupling base bodies has a base portion and projections provided integrally with the base portion in such a manner as to project in an axial direction, the projections of said one coupling base body and the projections of said other coupling base body being arranged alternately in the direction about the axis between the pair of projections of said one rotation transmitting member, between the pair of projections of said other rotation transmitting member, and between adjacent ones of the projections of said one and said other rotation transmitting members, respectively.

2. The shaft coupling mechanism according to claim 1, wherein each of the base portions of said one and said other rotation transmitting members has a smaller thickness than the axial thickness of a corresponding one of the projections of said one and said other rotation transmitting members.

3. The shaft coupling mechanism according to claim 1, wherein the base portions of said one and said other rotation transmitting members are superposed on each other in the axial direction.

4. The shaft coupling mechanism according to claim 1, wherein the projection of said one rotation transmitting member has a linear resistance characteristic with respect to the deformation in the direction about the axis, and the projection of said other rotation transmitting member has a nonlinear resistance characteristic which, in the deformation of less than the fixed degree in the direction about the axis, exhibits a gradient smaller than the gradient of the linear resistance characteristic of said one rotation transmitting member, and which, in the deformation of the fixed degree or greater in the direction about the axis, exhibits a gradient greater than the gradient of the linear resistance characteristic of said one rotation transmitting member.

5. The shaft coupling mechanism according to claim 1, wherein the projection of said one rotation transmitting member has a width in the direction about the axis which is greater than the width of the projection of said other rotation transmitting member in the direction about the axis.

6. The shaft coupling mechanism according to claim 5, wherein said other rotation transmitting member includes first and second rotation transmitting members between which said one rotation transmitting member is disposed.

7. The shaft coupling mechanism according to claim 6, wherein each projection of said first and second rotation transmitting members has an accommodating groove for accommodating a compressively deformed portion of the projection of said one rotation transmitting member, the accommodating groove being formed in cooperation with the projection of said one rotation transmitting member.

8. The shaft coupling mechanism according to claim 5, wherein the projection of said other rotation transmitting member has an accommodating groove for accommodating a compressively deformed portion of the projection of said one rotation transmitting member, the accommodating groove being formed in cooperation with the projection of said one rotation transmitting member.

9. The shaft coupling mechanism according to claims 1, wherein the projection of said other rotation transmitting member has a slit.

10. The shaft coupling mechanism according to claim 1, wherein said one and said other coupling base bodies respectively have at least one pair of projections.

11. The shaft coupling mechanism according to claim 1, wherein said shaft coupling mechanism is a shaft coupling mechanism for an electric power steering apparatus, and the one rotating shaft is adapted to be coupled to an output rotating shaft of an electric motor or a steering shaft of an automobile, and the other rotating shaft is adapted to be coupled to the steering shaft of the automobile or the output rotating shaft of the electric motor.

* * * * *